(12) United States Patent
Edwards et al.

(10) Patent No.: US 11,245,717 B1
(45) Date of Patent: Feb. 8, 2022

(54) AUTOMATED DETECTION, ALARMING, AND REMOVAL OF SUBDOMAIN TAKEOVERS

(71) Applicant: Amazon Technologies, Inc., Seattle, WA (US)

(72) Inventors: Zak Aaron Edwards, Seattle, WA (US); William Frederick Kruse, Seattle, WA (US); Ryan Pickren, Seattle, WA (US); Guifre Ruiz Utges, Terrassa (ES)

(73) Assignee: Amazon Technologies, Inc., Seattle, WA (US)

( * ) Notice: Subject to any disclaimer, the term of this patent is extended or adjusted under 35 U.S.C. 154(b) by 64 days.

(21) Appl. No.: 16/585,615

(22) Filed: Sep. 27, 2019

(51) Int. Cl.
*G06F 15/173* (2006.01)
*H04L 29/06* (2006.01)
*H04W 4/14* (2009.01)
*H04L 29/08* (2006.01)
*H04L 29/12* (2006.01)

(52) U.S. Cl.
CPC ...... *H04L 63/1433* (2013.01); *H04L 61/1511* (2013.01); *H04L 63/0838* (2013.01); *H04L 67/02* (2013.01); *H04W 4/14* (2013.01)

(58) Field of Classification Search
CPC ............. H04L 63/1433; H04L 61/1511; H04L 63/0838; H04L 67/02; H04W 4/14
USPC ............................ 709/223, 224, 226; 726/23
See application file for complete search history.

(56) References Cited

U.S. PATENT DOCUMENTS

| | | | | |
|---|---|---|---|---|
| 10,630,771 | B1* | 4/2020 | Garza | H04L 67/1095 |
| 2006/0015573 | A1* | 1/2006 | Hurst-Hiller | H04L 67/16 |
| | | | | 709/218 |
| 2008/0209451 | A1* | 8/2008 | Michels | G06F 9/54 |
| | | | | 719/328 |
| 2013/0103520 | A1* | 4/2013 | Lyon | G06Q 30/02 |
| | | | | 705/26.1 |
| 2013/0103785 | A1* | 4/2013 | Lyon | H04N 21/2385 |
| | | | | 709/217 |
| 2013/0198266 | A1* | 8/2013 | Kiley | H04L 67/34 |
| | | | | 709/203 |
| 2015/0170072 | A1* | 6/2015 | Grant | H04L 67/02 |
| | | | | 705/7.36 |
| 2017/0118128 | A1* | 4/2017 | Vishnoi | H04L 45/02 |
| 2017/0149770 | A1* | 5/2017 | Hinton | H04L 63/10 |

(Continued)

OTHER PUBLICATIONS

Hinden, et al., "Unique Local IPv6 Unicast Addresses", Network Working Group, Request for Comments: 4193, Oct. 2005, 16 pages.

(Continued)

*Primary Examiner* — Liang Che A Wang
(74) *Attorney, Agent, or Firm* — Nicholson De Vos Webster & Elliott LLP

(57) ABSTRACT

Techniques for automated detection and mitigation of subdomain takeovers are described. A method for automated detection and mitigation of subdomain takeovers comprises receiving, by a subdomain manager, a request to monitor one or more resources associated with one or more mapping records, periodically scanning each resource from the one or more resources, receiving a response from at least one resource indicating that the at least one resource does not exist or is invalid, and sending a notification indicating that the at least one resource does not exist or is invalid using a notification service.

20 Claims, 8 Drawing Sheets

(56) References Cited

U.S. PATENT DOCUMENTS

2018/0375716 A1* 12/2018 Huque ................ H04L 61/6009
2020/0250664 A1* 8/2020 Kumar .................. H04L 63/083

OTHER PUBLICATIONS

Rekhter, et al., "Address Allocation for Private Internets", Network Working Group, Request for Comments: 1918, Feb. 1996, 9 pages.

* cited by examiner

AUTOMATED DETECTION, ALARMING, AND REMOVAL OF SUBDOMAIN TAKEOVERS

BACKGROUND

Domain name systems (DNS) records are used to create a mapping between a publicly resolvable name from domain A to domain B. This enables a company to use a third-party product to host a web site or application, but make use of their own personal domain names. DNS functionality may be implemented as services may be implemented by providers who utilize virtualization technologies to provide a variety of services. DNS records may map to resources provided by such networks, and these resources may be hosted by the same provider as the DNS service or a different provider with a different data center.

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for automated detection and mitigation of subdomain takeovers. As discussed, DNS records can be used to create a mapping between the domain where the resource is actually hosted (e.g., domain A) and their own domain (e.g., domain B). This allows users to utilize hosting services and other services of a third party, while still providing access to those services through their own personal domains. However, such a mapping inherently assumes that domain B always points to a resource that exists and is under the user's control. If not, a malicious individual can generate a resource that is associated with the same domain name in the now faulty mapping and effectively take control of domain A in what is called a subdomain takeover. According to some embodiments, a subdomain management service can be used to test mappings that a user has defined to determine if the mapping is still valid and if the resource is still under the user's control. In some embodiments, the subdomain management service can be implemented in a DNS service provided by a provider network or implemented as a standalone tool in a customer's datacenter. The subdomain management service can ping resources identified in mappings and determine whether the mapping is still valid based on the response. In some embodiments, the subdomain management service may determine that the mapping is no longer valid if the resource does not exist or if the resource has already been compromised via a subdomain takeover. If the mapping is no longer valid, the subdomain management service can generate an alert to let the user know that a security vulnerability has been detected. In some embodiments, the subdomain management service can automatically.

Figure 1:
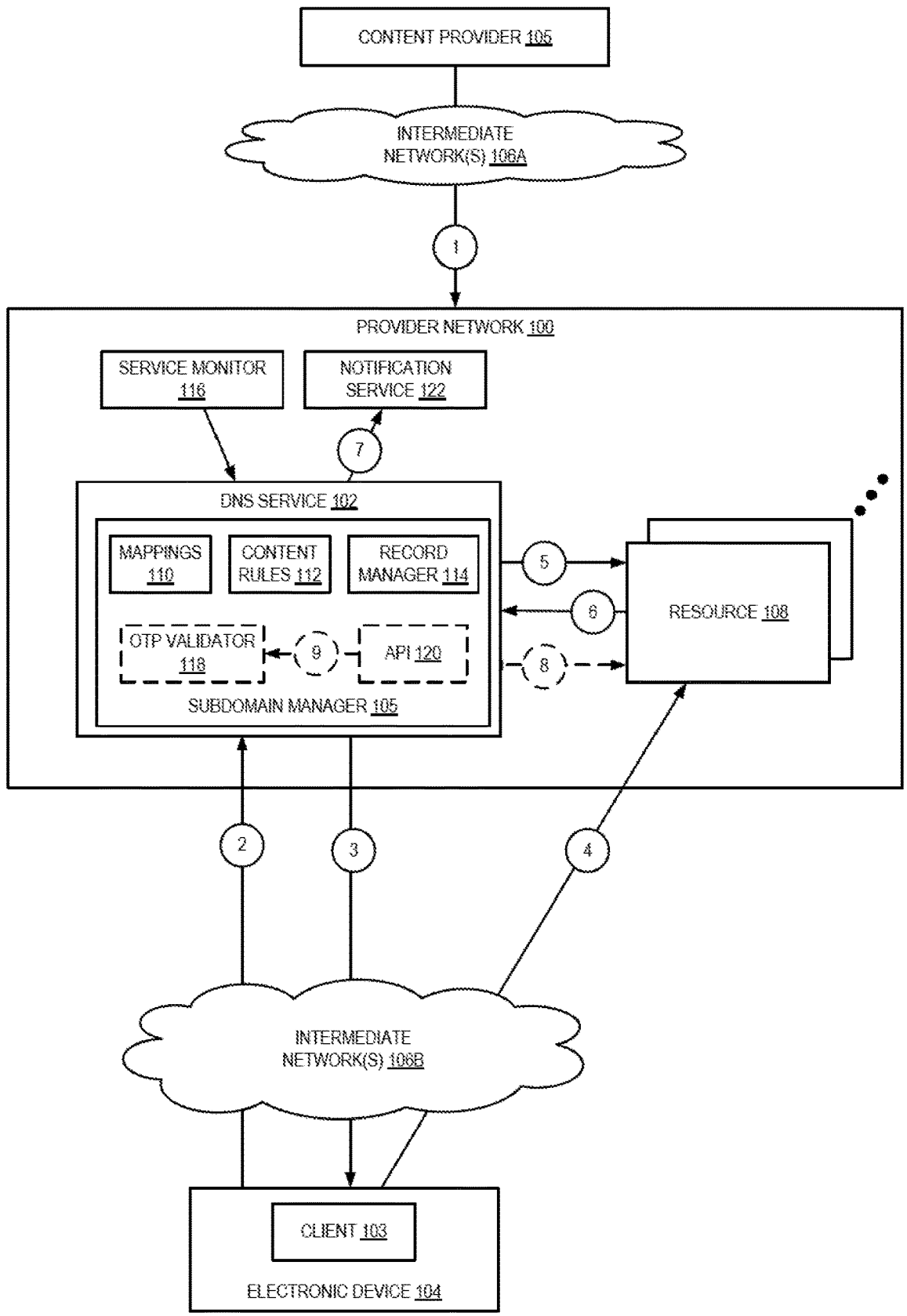
FIG. 1 is a diagram illustrating an environment for automated detection and mitigation of subdomain takeovers using a provider network-based domain name system (DNS) according to some embodiments.

FIG. 1 is a diagram illustrating an environment for automated detection and mitigation of subdomain takeovers using a provider network-based domain name system (DNS) according to some embodiments. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown in FIG. 1, a DNS service 102 can be provided by provider network 100. The DNS service can maintain mappings 110 provided by one or more content providers at numeral 1. For example, these mappings may be canonical name records (CNAMEs) which specify that one domain name is an alias of another domain name. For example, a content provider may choose to store web accessible resources in a storage location of a storage service in provider network 100. When the content provider creates the storage location, a domain name may be automatically generated for that storage location based on the name of the storage location. As an example, a content provider may create a storage location called myStorageLocation and the provider network may automatically generate a domain name for this at mystoragelocation.providerdomain.com. However, the content provider may have their own provide domain, called contentprovider.com, and may desire that the resources stored in the storage location. As such, the content provider can provide a mapping record to the DNS service that maps mystoragelocation.providerdomain.com to subdomain.contentprovider.com.

A user, using electronic device 104 and a client application 103, such as a web browser, can access a resource by entering a domain name. At numeral 2, the client device can send a lookup request to DNS service 102 for the domain that the user entered. The DNS service will find the domain in the mapping records 110 and return the IP address for the mapped domain at numeral 3. For example, if the user enters subdomain.contentprovider.com, the DNS service can determine via the mapping records 110 that it is an alias for mystoragelocation.providerdomain.com. The DNS service may then provide the IP address associated with mystoragelocation.providerdomain.com. The client application can then use the returned IP address to access the resource 108 associated with the domain name that the user entered, as shown at numeral 4.

If the resource no longer exists, for example if the content provider moves the resource, takes down the resource, etc., but the mapping still exists, the user will receive a 404 message indicating that the resource does not exist. Because many service providers generate a domain name based on the name of the storage location, if a new storage location is created having the same name as the old storage location, it will be assigned the same domain name. As such, future requests for subdomain.contentprovider.com will continue to be mapped to mystoragelocation.providerdomain.com, but this will no longer be a resource controlled by the content provider. This leads to a security vulnerability which may expose customer data, authentication/authorization tokens and cookies, and other security risks.

To address this security vulnerability, the DNS service 102 can be enhanced to include a subdomain manager 105 which provides automated subdomain takeover detection and mitigation. The content provider (or other user who has hosted resources and DNS mappings for these resources) can provide a list of mappings to be periodically checked to ensure they are still valid. At numeral 5, a record manager can ping each resource that is listed in the mappings. At numeral 6, the record manager can receive a response for each ping. If the resource exists, then data is received back from the resources. For example, if the resource is a storage location in a storage service that includes a web application then data from the web application may be received. If the resource no longer exists, then a "not found" error, such as a HTTP 404 error, may be returned. This may be because the resource has been deleted by the content provider and the mapping has not been updated. Alternatively, this may be because the hosting service is offline due to a power outage or other service disruption. In either case, at numeral 7, after a not found error has been received, a notification can be sent to the content provider through a notification service 122. The notification may indicate the resource that was pinged and returned the error, the time the error was received, and other data associated with the resource and/or the error.

In some embodiments, before a notification is sent via notification service 122 the record manager can determine whether there is a service outage associated with the resource. For example, if the resource is a storage location of the storage service, the record manager 114 can request a current service status of the storage service from service monitor 116. If the storage service is currently down, then the record manager can schedule another ping for that resource for a particular amount of time in the future (e.g., 15 minutes, 1 hour, 1 day, etc.). The record manager may continue to schedule future pings until the service is confirmed to be live and the resource can be checked.

In some embodiments, in addition to the mapping records provided by the content provider 105 at numeral 1, the content provider can also provide notification preferences. This may include under what conditions they are to be notified and through what channels. For example, the content provider 105 may specify an email messaging service, a short message service (SMS) messaging service, an alert system, or other messaging service. The content provider may also specify that they want alerts if any of their resources from their mapping records returns an error, or only if a particular resource returns an error for a specified number of attempts.

In some embodiments, the content provider may also provide one or more content rules 112 that may be used by the record manager 114 to validate any data received from a resource in response to a ping. If the resource was deleted, but a malicious actor set up a new resource before the record manager was able to check on the resource, then content may be returned. However, because this resource is now controlled by the malicious actor, the content may have been changed, e.g., to introduce malicious code to anyone accessing the resource, read authentication/authorization data from users accessing the resource, or other malicious actions. By validating the data received in response to the ping, the record manager can ensure that the resource is still controlled by the content provider 105. In some embodiments, the content rules may include a validation copy of the data that is expected to be received. This may include a recently cached copy of the data, or a copy of the data provided by content provider 105. The record manager 114 can compare the validation copy of the data to the data received in response to the ping. If the data do not match, then a notification can be sent to the content provider through notification service 122 at numeral 7. In some embodiments, the content rules may define particular markers (e.g., canaries) that are included in the data that is returned. The record manager 114 can search for these markers in the returned data. If the markers are not identified, then a notification can be sent to the content provider using the notification service.

In some embodiments, the content rules 112 may include an API 120 that can be used to make a call to the resource in response to receiving data in return from the ping. At numeral 8, the API call can be made to resource(s) 108 and a one-time password (OTP) can be returned. The OTP can be validated using OTP validator 118. The API call and OTP validator can be provided to the DNS service 102 as a plugin (e.g., a software development kit (SDK) plugin) by the content provider or the provider network and/or DNS service may have its own OTP validation service. In some embodiments, content checking can be offloaded to a machine learning service that determines whether the look of the returned data matches the previous look of a cached copy of the data.

In some embodiments, in addition to notification preferences, the content provider 105 may specify a deletion policy. The deletion policy may identify one or more resources which, if it is determined the resources no longer exist, the corresponding DNS mapping records are to be deleted. In some embodiments, the notification sent to the content provider may include a request for confirmation before the mapping record is deleted. In some embodiments, the mapping record may be automatically deleted. In some embodiments, if the resource cannot be found or is no longer valid, the mapping record may be updated to map to a different resource. For example, the content provider may maintain a resource to which mappings to deleted or invalid resources are to be remapped. In some embodiments, a scanning interval can be set by the content provider 106 which causes the record manager 114 to check each resource in the mappings specified by the content providers at the specified interval (e.g., hourly, weekly, etc.).

Figure 2:
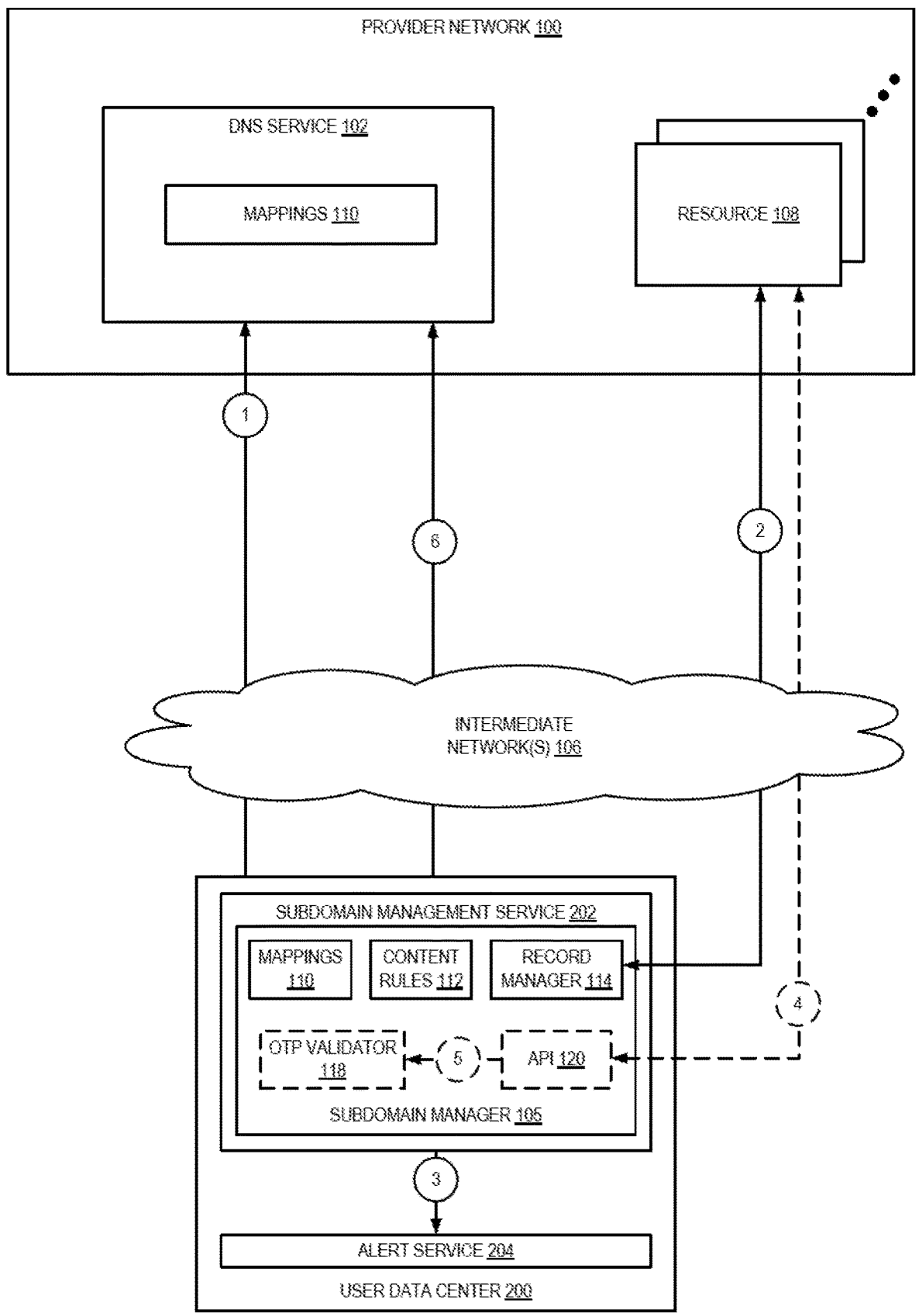
FIG. 2 is a diagram illustrating an environment for automated detection and mitigation of subdomain takeovers using a customer-hosted subdomain management service according to some embodiments.

FIG. 2 is a diagram illustrating an environment for automated detection and mitigation of subdomain takeovers using a customer-hosted subdomain management service according to some embodiments. As shown in FIG. 2, a user may implement the subdomain manager 105 as a standalone subdomain management service 202 in their own datacenter 200. As shown at numeral 1, the user can provide mapping records 110 to the DNS service they are using, such as DNS service 102 provided by provider network 100 and/or other DNS. The subdomain management service 202 may include a record manager 114, as described above with respect to FIG. 1. At numeral 2, the record manager 114 can check the resources defined in the mapping records 110 (or a selected subset of the mapping records) at a scanning interval defined me the user. As discussed above, if a resource is not found (e.g., returns an HTTP 404 or similar "not found" error) then the record manager 114 can send a notification to the user. In some embodiments, the subdomain management service 202 can send the notification at numeral 3 using an alert service 204 implemented in user data center 200. The notification may be sent based on notification preferences, similar to those discussed above with respect to FIG. 1.

In some embodiments, if data is returned in response to the ping from the record manager, the subdomain management service 202 may validate the resource using an API 120, as discussed above. At numeral 4, the API call can be made to resource(s) 108 and a one-time password (OTP) can be returned. The OTP can be validated at numeral 5 using OTP validator 118 implemented in the subdomain management service 202. As discussed above, in some embodiments, content checking can be offloaded to a machine learning service that determines whether the look of the returned data matches the previous look of a cached copy of the data. If the data cannot be validated (e.g., the OTP is not valid, the data is missing the expected markers, etc.) then an alert can be sent to the user using alert service 204. If a resource corresponding to one of the mappings is determined to be deleted or no longer valid, the mapping records can be updated at numeral 6 to delete and/or change the mapping record for that resource or resources.

Figure 3:
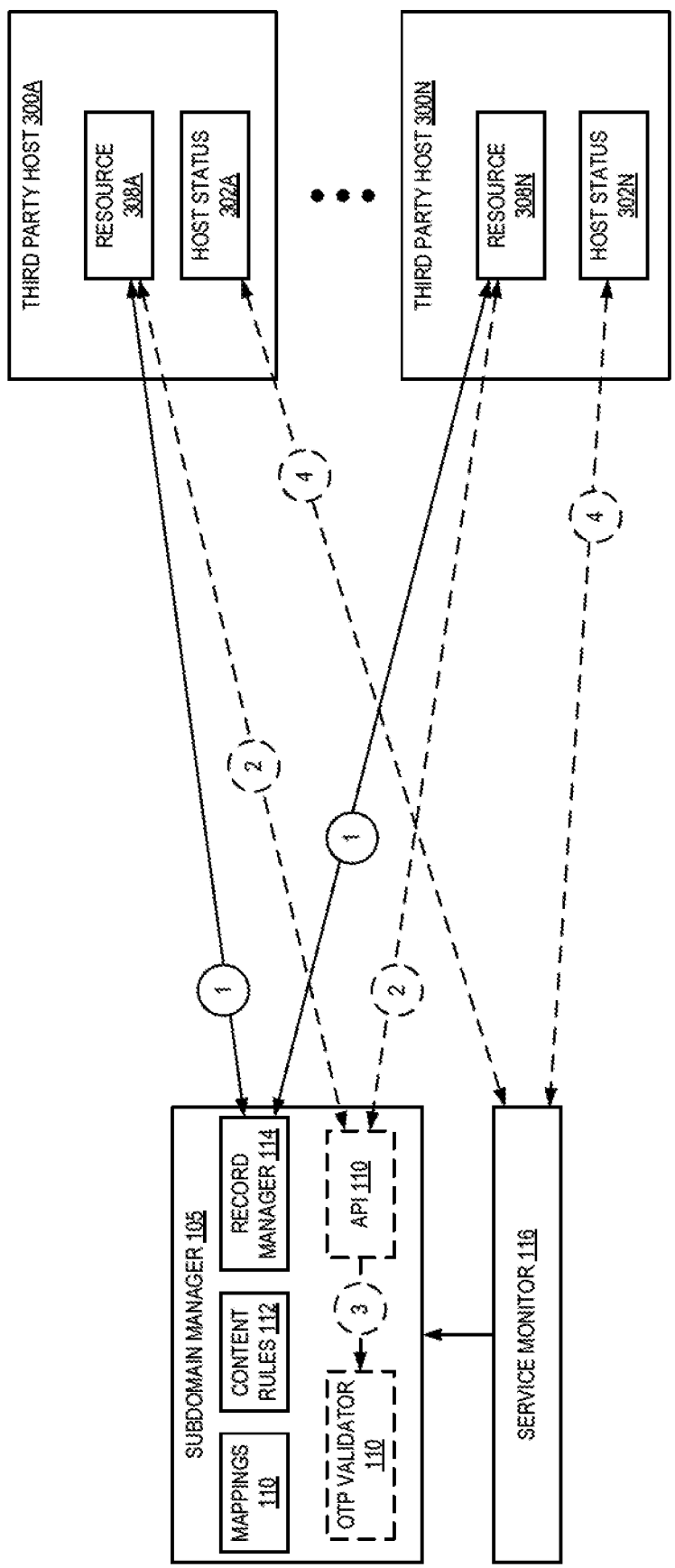
FIG. 3 is a diagram illustrating an environment for automated detection and mitigation of subdomain takeovers of third party hosted resources according to some embodiments.

FIG. 3 is a diagram illustrating an environment for automated detection and mitigation of subdomain takeovers of third party hosted resources according to some embodiments. In the above examples, subdomain management functionality can be implemented in a DNS service for use in checking the presence/validity of resources hosted by the provider network, or may be implemented as a standalone subdomain management service implemented in a user's data center. In some embodiments, as shown in FIG. 3, the subdomain manager 105, implemented in DNS service 102 or as a standalone subdomain management service 202, may also be used to check the presence/validity of resources hosted by third parties 300A-300N. These third party hosts may be other provider networks, web servers, or other hosts that are capable of hosting internet accessible content. In this embodiment, mappings 110 may include mappings to resources 308A-308N in third party hosts 300A-300N. The record manager 114 can scan the resources of each mapping record at numeral 1. This may be performed as discussed above, by pinging the IP address associated with each resource. Based on the response, an alert can be sent and, optionally, mapping records may be deleted, if the resource is determined to no longer exist.

In some embodiments, at numeral 2, if data is returned in response to the ping from the record manager, the subdomain management service 202 may validate the resource using an API 120, as discussed above. The API call can be made to resource(s) 308A-308N and a one-time password (OTP) can be returned. The OTP can be validated at numeral 3 using OTP validator 118 implemented in the DNS service as a plugin, as discussed above. In some embodiments, service monitor 116 can be configured to determine the current host status of one or more of the third party hosts 300A-N. For example, one or more of the third party hosts may provide a host status endpoint 302A-302N which when pinged provides a current status of the host (e.g., is the host live, down, undergoing maintenance, etc.). These status messages can be received by the service monitor which can be checked by the record manager if a not found error is received from a resource. If the host is determined to be down, the record manager can schedule a future ping of that resource. If the host is now live, and the resource is still not found, then an alert can be sent to the user based on the notification rules provided by the user.

Figure 4:
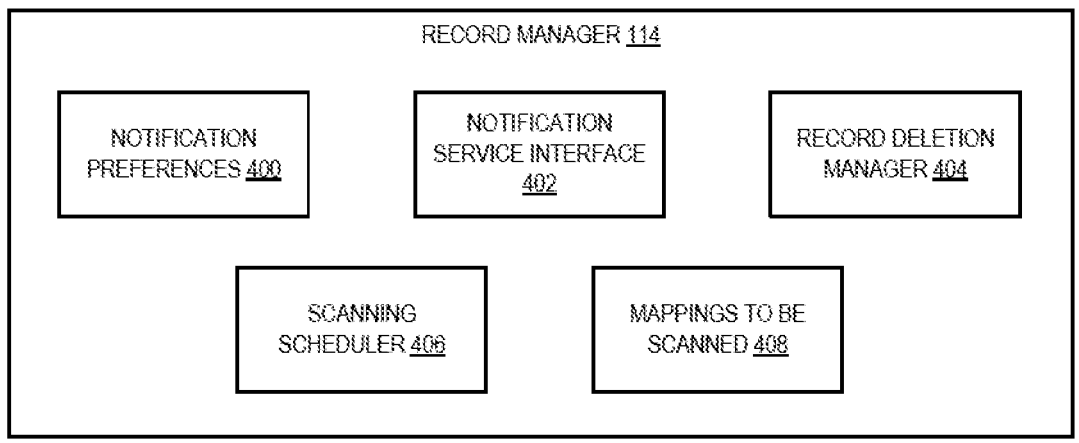
FIG. 4 is a diagram illustrating a notification and scheduling services for automated detection and mitigation of subdomain takeovers according to some embodiments.

FIG. 4 is a diagram illustrating a notification and scheduling services for automated detection and mitigation of subdomain takeovers according to some embodiments. As discussed above, record manager 114 can maintain notification preferences 400 which may be provided by a user when a service is onboarded. The notification preferences may include a notification service (e.g., an email notification service, SMS notification service, or other notification service), as well as the conditions under which a notification is to be sent. For example, a user may choose to have a notification sent anytime any resource is not found, or may choose to have a notification sent when a resource is found not to include expected content. In some embodiments, the user may choose to have a notification sent only if the resource is not found over the course of a specified number of scans (either consecutive or nonconsecutive). The record manager 114 may support a plurality of notification services via notification service interface 402. The user may be given the option to choose a notification service with which the record manager is configured to communicate via a corresponding notification service interface. In some embodiments, if the user wishes to use an unsupported notification service, the user may provide a notification service interface, such as an SDK or other plugin to the record manager.

In some embodiments, the record manager may include a record deletion manager 404. If the user opts-in to have one or more records corresponding to missing or invalid resources deleted, the record deletion manager can maintain a list of the resources for which the user has opted-in. If the record manager determines that one of these resources is missing or invalid, the record deletion manager can automatically send a request to the DNS to delete the corresponding record. In some embodiments, the user may also specify a scanning schedule (e.g., hourly, daily, weekly, or other time period). The scanning scheduler can provide scanning schedule options for the user to choose from or may receive arbitrary scanning schedules from the user. The scanning scheduler can cause the record manager to ping each resource corresponding to a mapping to be scanned 408 at the scheduled time. Mappings to be scanned 408 may include a specified subset of a user's mapping records which the user wants scanned.

Embodiments have been generally discussed with respect to CNAME records corresponding to a missing resource, and a "not found" error is received. In some embodiments, other forms of DNS may also be vulnerable to subdomain takeovers. In such embodiments, a "not found" error may include a "serve fail" or "auth fail" error, for example in response to a DNS dig call when the corresponding resource is no longer available. Embodiments may be similarly implemented where DNS dig commands, rather than, or in addition to, pings, are sent to the mappings, and "serve fail" or "auth fail" responses are received.

Figure 5:
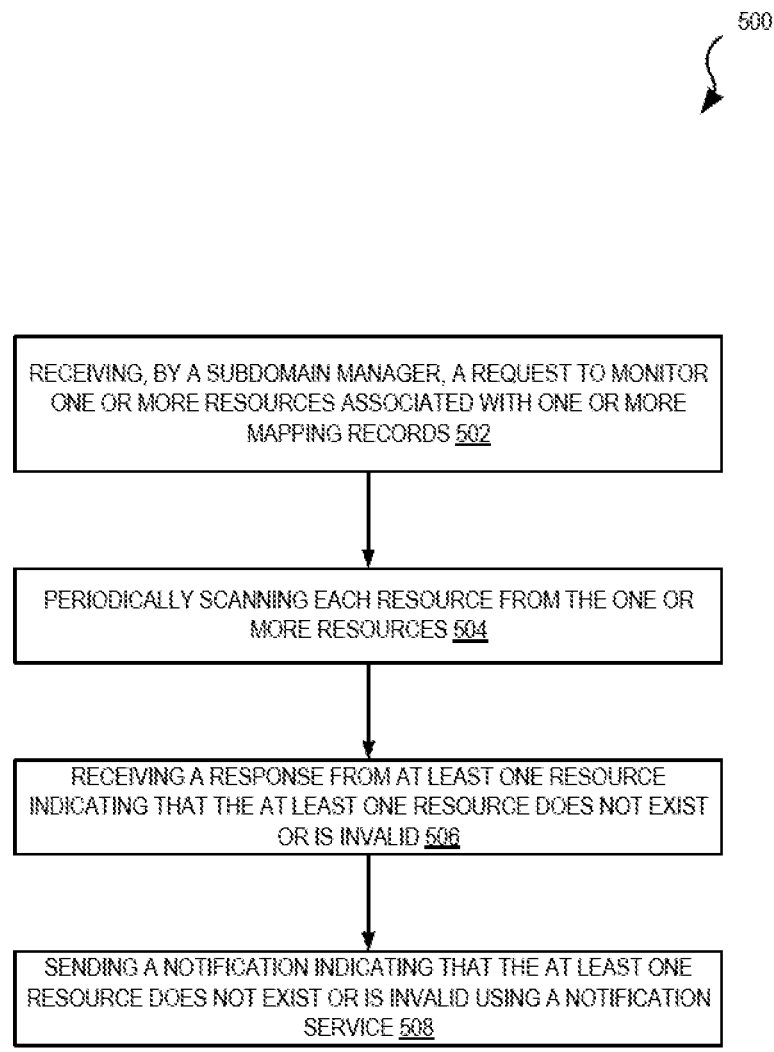
FIG. 5 is a flow diagram illustrating operations of a method for automated detection and mitigation of subdomain takeovers according to some embodiments.

FIG. 5 is a flow diagram illustrating operations 500 of a method for automated detection and mitigation of subdomain takeovers according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the DNS service 102 and/or subdomain manager 105 of the other figures.

The operations 500 include, at block 502, receiving, by a subdomain manager, a request to monitor one or more resources associated with one or more mapping records. In some embodiments, the one or more mapping records are a subset of a plurality of mapping records associated with a user. The operations 500 further include, at block 504, periodically scanning each resource from the one or more resources. In some embodiments, scanning may include pinging each resource. In some embodiments, each resource from the one or more resources is scanned at a time interval defined by a user.

The operations 500 further include, at block 506, receiving a response from at least one resource indicating that the at least one resource does not exist or is invalid. In some embodiments, the response from the at least one resource indicating that the at least one resource does not exist is a "not found" error response. In some embodiments, the operations may further include determining a marker is not included in data received with the response, and generating the notification indicating that the at least one resource is invalid. In some embodiments, the operations may further include after receiving the response from the at least one resource, sending an application programming interface (API) call to the resource, receiving a one-time password in response to the API call, determining the one time password is invalid, and generating a notification indicating that the at least one resource is invalid.

The operations 500 further include, at block 508, sending a notification indicating that the at least one resource does not exist or is invalid using a notification service. In some embodiments, the notification service includes one or more of an email notification service and a simple message service (SMS) notification service. In some embodiments, the operations may further include receiving a request to automatically delete a mapping record associated with at least one resource if the at least one resource is found to no longer exist or if the at least one resource is no longer valid, and updating a record deletion manager to include the at least one resource. In some embodiments, the operations may further include determining a first resource no longer exists or is no longer valid based on the response received from the first resource, determining the first resource is included in the record deletion manager, and sending a request to a DNS to delete a first mapping record associated with the first resource.

In some embodiments, the subdomain manager is implemented in a domain name system (DNS) service in a provider network. In some embodiments, the subdomain manager is implemented in a user's datacenter.

In some embodiments, the operations may include receiving a plurality of canonical name records at a domain name system (DNS) service of a provider network, the DNS service including a subdomain manager, receiving, by a subdomain manager, a request to monitor one or more resources associated with one or more of the canonical name records, pinging each resource from the one or more resources, receiving a response from a first resource, the response including content served by the first resource, sending an application programming interface (API) call to the first resource, receiving a one-time password in response to the API call, determining the one time password is invalid, and sending a notification indicating that the first resource is invalid using a notification service. In some embodiments, the operations may further include receiving a response from a second resource associated with a second canonical name record indicating that the second resource does not exist, wherein the response from the second resource is an HTTP 404 error message, and sending a second notification indicating that the second resource does not exist using a notification service. In some embodiments, the operations may further include before sending the second notification, sending a request to a service monitor to determine a status associated with the second resource, and receiving a status response indicating that a service associated with the second resource is live.

Figure 6:
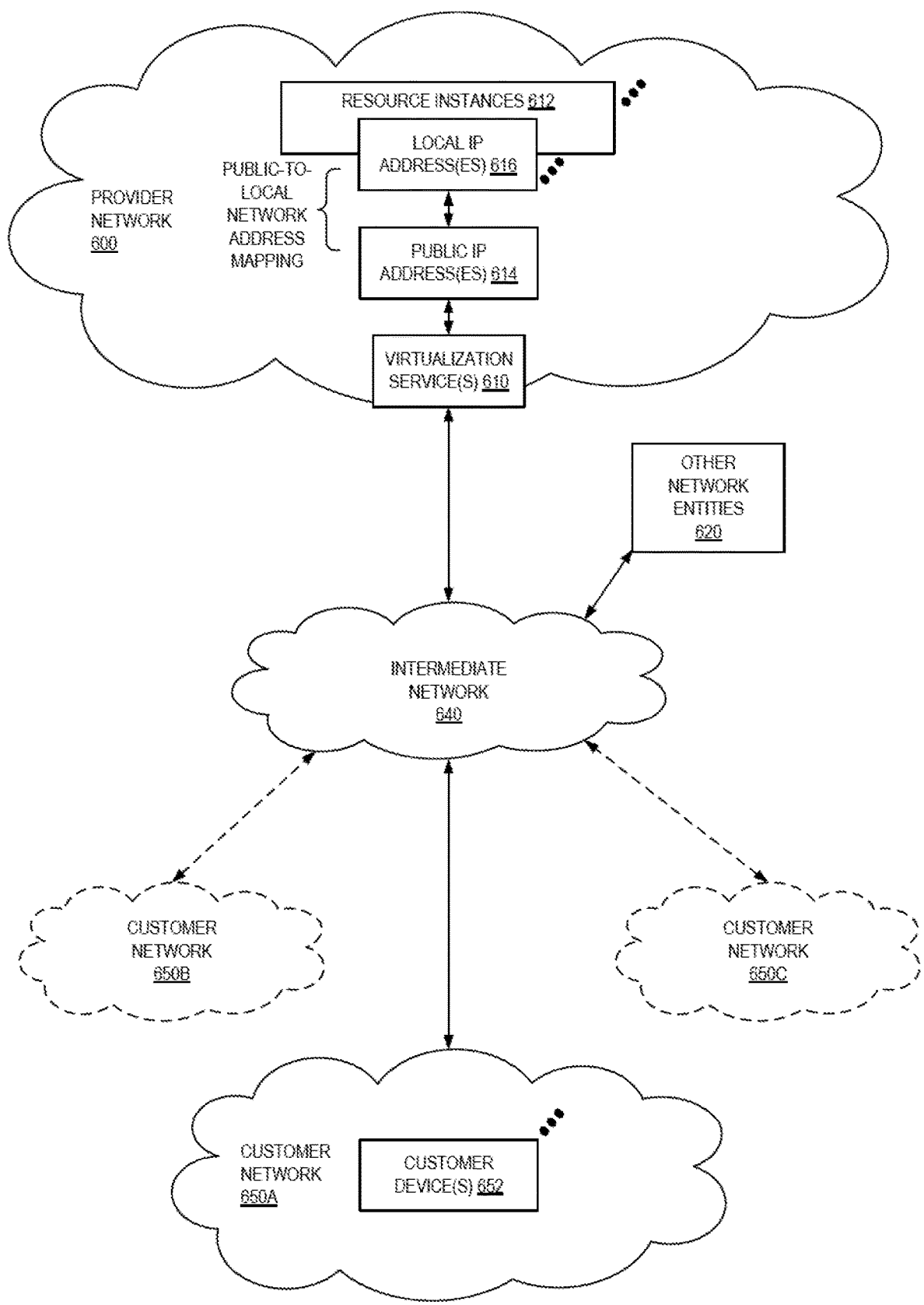
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
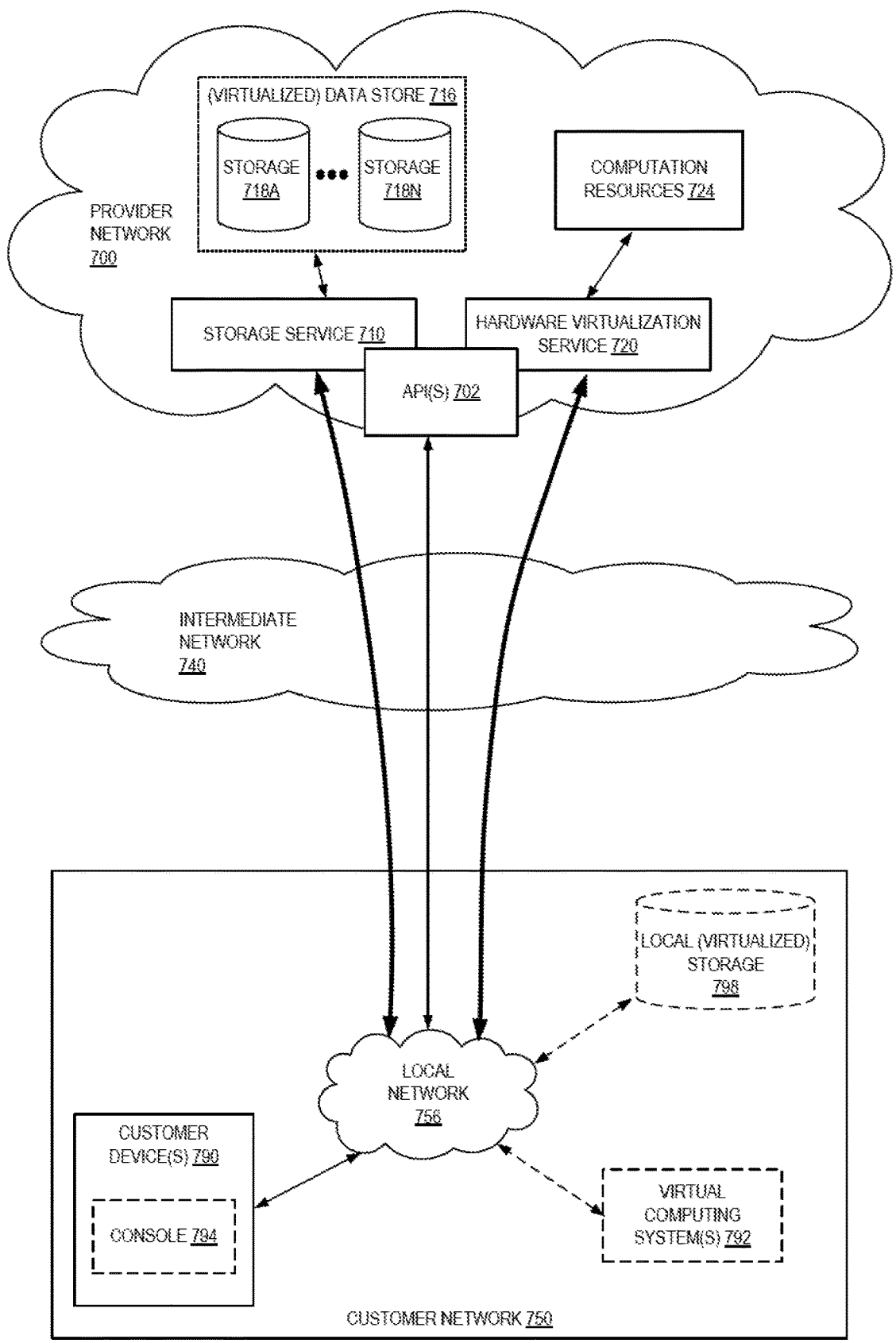
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
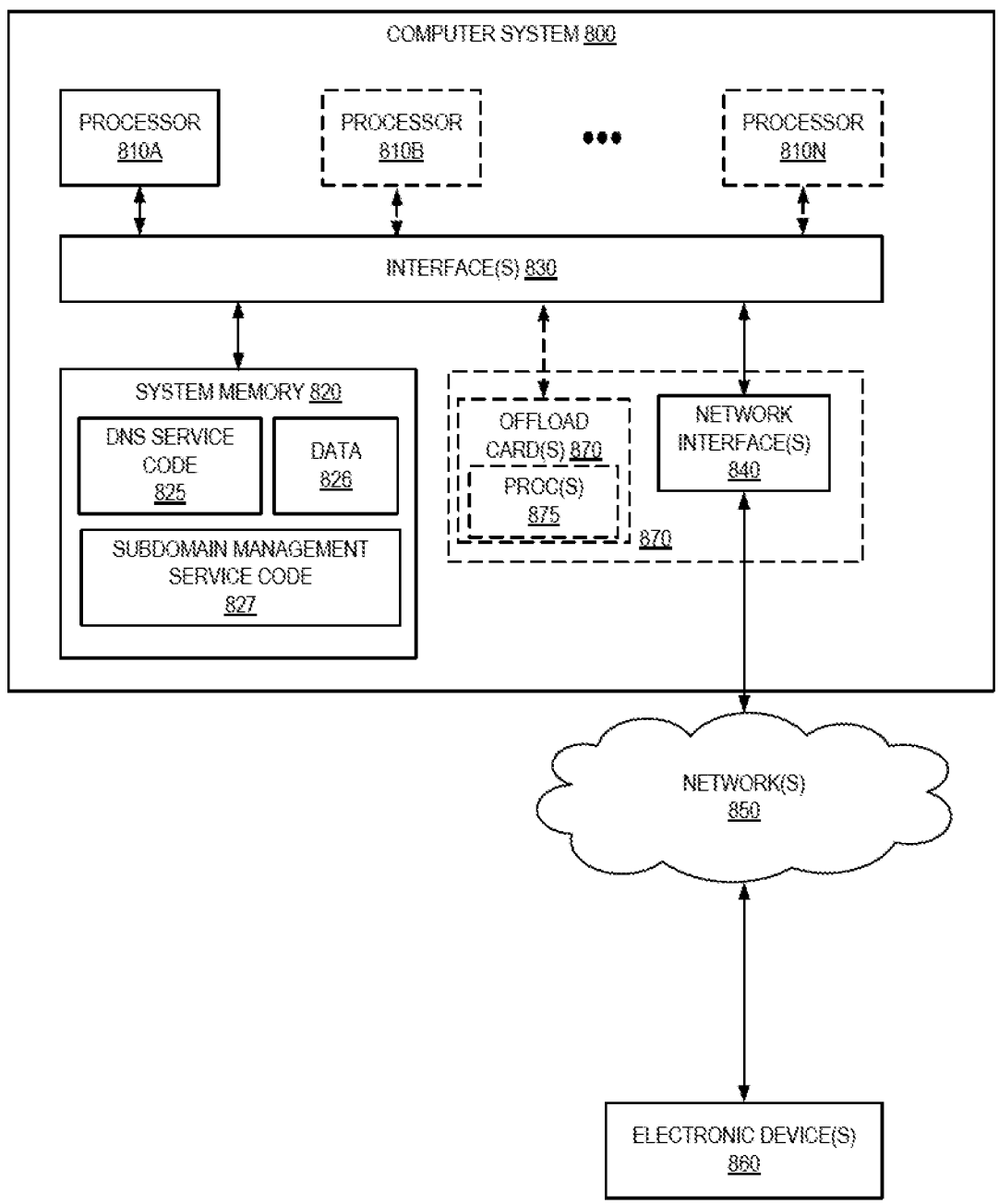
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as DNS service code 825, subdomain management service 827, and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a plurality of canonical name records at a domain name system (DNS) service of a provider network, the DNS service including a subdomain manager;
receiving, by a subdomain manager, a request to monitor one or more resources associated with one or more of the canonical name records for subdomain takeover;
pinging each resource from the one or more resources;
receiving a response from a first resource of the one or more resources, the response including content served by the first resource;
sending an application programming interface (API) call to the first resource;
receiving a one-time password in response to the API call;
determining the one-time password is invalid; and
sending a notification indicating that the first resource is invalid using a notification service.

2. The computer-implemented method of claim 1, further comprising:
    receiving a response from a second resource associated with a second canonical name record indicating that the second resource does not exist, wherein the response from the second resource is an HTTP 404 error message; and
    sending a second notification indicating that the second resource does not exist using a notification service.

3. The computer-implemented method of claim 2, further comprising:
    before sending the second notification, sending a request to a service monitor to determine a status associated with the second resource; and
    receiving a status response indicating that a service associated with the second resource is live.

4. A computer-implemented method comprising:
    receiving, by a subdomain manager, a request to monitor one or more resources associated with one or more canonical name records for subdomain takeover, each canonical name record of the one or more canonical name records comprising a mapping between domain name system (DNS) domain names;
    periodically scanning each resource from the one or more resources associated with the one or more canonical name records;
    receiving a response from at least one resource indicating that the at least one resource does not exist or is invalid; and
    sending a notification indicating that the at least one resource does not exist or is invalid using a notification service.

5. The computer-implemented method of claim 4, wherein the response from the at least one resource indicating that the at least one resource does not exist is a "not found" error response.

6. The computer-implemented method of claim 4, further comprising:
    determining a marker is not included in data received with the response; and
    generating the notification indicating that the at least one resource is invalid.

7. The computer-implemented method of claim 4, further comprising:
    after receiving the response from the at least one resource, sending an application programming interface (API) call to the resource;
    receiving a one-time password in response to the API call;
    determining the one time-password is invalid; and
    generating a notification indicating that the at least one resource is invalid.

8. The computer-implemented method of claim 4, further comprising:
    receiving a request to automatically delete a canonical name record associated with at least one resource if the at least one resource is found to no longer exist or if the at least one resource is no longer valid; and
    updating a record deletion manager to include the at least one resource.

9. The computer-implemented method of claim 8, further comprising:
    determining a first resource no longer exists or is no longer valid based on the response received from the first resource;
    determining the first resource is included in the record deletion manager; and
    sending a request to a DNS to delete a first canonical name record associated with the first resource.

10. The computer-implemented method of claim 4, wherein each resource from the one or more resources is scanned at a time interval defined by a user.

11. The computer-implemented method of claim 4, wherein the one or more canonical name records are a subset of a plurality of canonical name records associated with a user.

12. The computer-implemented method of claim 4, wherein the notification service includes one or more of an email notification service and a simple message service (SMS) notification service.

13. The computer-implemented method of claim 4, wherein the subdomain manager is implemented in a domain name system (DNS) service in a provider network.

14. The computer-implemented method of claim 4, wherein the subdomain manager is implemented in a user's datacenter.

15. A system comprising:
    a first one or more electronic devices to implement a domain name system (DNS) service; and
    a second one or more electronic devices to implement a subdomain manager, the subdomain manager including instructions that upon execution cause the subdomain manager to:
        receive a request to monitor one or more resources associated with one or more canonical name records for subdomain takeover, each canonical name record of the one or more canonical name records comprising a mapping between domain name system (DNS) domain names;
        periodically scan each resource from the one or more resources;
        receive a response from at least one resource indicating that the at least one resource does not exist or is invalid; and
        send a notification indicating that the at least one resource does not exist or is invalid using a notification service.

16. The system of claim 15, wherein the response from the at least one resource indicating that the at least one resource does not exist is a "not found" error response.

17. The system of claim 15, wherein the instructions, when executed further cause the subdomain manager to:
    determine a marker is not included in data received with the response; and
    generate the notification indicating that the at least one resource is invalid.

18. The system of claim 15, wherein the instructions, when executed further cause the subdomain manager to:
    after receiving the response from the at least one resource, send an application programming interface (API) call to the resource;
    receive a one-time password in response to the API call;
    determine the one time password is invalid; and
    generate a notification indicating that the at least one resource is invalid.

19. The system of claim 15, wherein the instructions, when executed further cause the subdomain manager to:
    receive a request to automatically delete a canonical name record associated with at least one resource if the at least one resource is found to no longer exist or if the at least one resource is no longer valid; and
    update a record deletion manager to include the at least one resource.

20. The system of claim 19, wherein the instructions, when executed further cause the subdomain manager to:
- determine a first resource no longer exists or is no longer valid based on the response received from the first resource;
- determine the first resource is included in the record deletion manager; and
- send a request to a DNS to delete a first canonical name record associated with the first resource.

* * * * *